(12) United States Patent
Cao et al.

(10) Patent No.: US 9,734,166 B2
(45) Date of Patent: Aug. 15, 2017

(54) ASSOCIATION OF VISUAL LABELS AND EVENT CONTEXT IN IMAGE DATA

(71) Applicant: International Business Machines Corporation, Armonk, NY (US)

(72) Inventors: Liangliang Cao, Yorktown Heights, NY (US); Yuan-Chi Chang, Armonk, NY (US); Quoc-Bao Nguyen, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 13/975,497

(22) Filed: Aug. 26, 2013

(65) Prior Publication Data

US 2015/0058348 A1    Feb. 26, 2015

(51) Int. Cl.
*G06F 17/30* (2006.01)

(52) U.S. Cl.
CPC .. *G06F 17/30268* (2013.01); *G06F 17/30017* (2013.01); *G06F 17/30038* (2013.01); *G06F 17/30855* (2013.01)

(58) Field of Classification Search
CPC ......... G06F 17/30268; G06F 17/30017; G06F 17/30038; G06F 17/30855
See application file for complete search history.

(56) References Cited

U.S. PATENT DOCUMENTS

| | | | | |
|---|---|---|---|---|
| 5,983,237 | A * | 11/1999 | Jain | G06F 17/30256 |
| 6,463,432 | B1 * | 10/2002 | Murakawa | G06F 17/30256 |
| 6,611,825 | B1 * | 8/2003 | Billheimer | G06F 17/30616 382/156 |
| 6,976,000 | B1 * | 12/2005 | Manganaris | G06Q 30/02 705/7.33 |
| 7,117,226 | B2 * | 10/2006 | Labelle | G06F 17/3025 382/165 |
| 7,447,677 | B2 * | 11/2008 | Milligan | G06F 17/3089 |
| 8,130,285 | B2 * | 3/2012 | Haupt | G06K 9/00771 348/231.2 |

(Continued)

FOREIGN PATENT DOCUMENTS

EP    2426517 A2    3/2012

OTHER PUBLICATIONS

J. Deng et al., "ImageNet: A Large-Scale Hierarchical Image Database," IEEE Conference on Computer Vision and Pattern Recognition (CVPR), Jun. 2009, pp. 248-255.

(Continued)

*Primary Examiner* — Rehana Perveen
*Assistant Examiner* — Huen Wong
(74) *Attorney, Agent, or Firm* — Alexa L. Ashworth; Ryan, Mason & Lewis, LLP

(57) ABSTRACT

A first set of contextual dimensions is generated from one or more textual descriptions associated with a given event, which includes one or more examples. A second set of contextual dimensions is generated from one or more visual features associated with the given event, which includes one or more visual example recordings. A similarity structure is constructed from the first set of contextual dimensions and the second set of contextual dimensions. One or more of the textual descriptions is matched with one or more of the visual features based on the similarity structure.

21 Claims, 7 Drawing Sheets

(56) References Cited

U.S. PATENT DOCUMENTS

| | | | |
|---|---|---|---|
| 9,025,811 B1* | 5/2015 | Ioffe | G06K 9/62 382/100 |
| 2002/0065460 A1* | 5/2002 | Murao | G06F 19/321 600/425 |
| 2002/0161747 A1* | 10/2002 | Li | G06F 17/30017 |
| 2002/0196292 A1* | 12/2002 | Itoh | G06T 11/206 715/853 |
| 2003/0004966 A1* | 1/2003 | Bolle | G06F 17/30253 |
| 2004/0071368 A1* | 4/2004 | Chadha | G06F 17/30244 382/305 |
| 2004/0267718 A1* | 12/2004 | Milligan | G06F 17/3089 |
| 2006/0235870 A1* | 10/2006 | Musgrove | G06F 17/30734 |
| 2006/0262976 A1* | 11/2006 | Hart | G06F 17/30247 382/190 |
| 2006/0285172 A1* | 12/2006 | Hull | G06F 17/30247 358/448 |
| 2007/0050393 A1* | 3/2007 | Vogel | G06F 17/30864 |
| 2007/0083509 A1* | 4/2007 | Wu | G06F 17/30616 |
| 2009/0112923 A1 | 4/2009 | Chang | |
| 2012/0011118 A1* | 1/2012 | Gleicher | G06F 17/2235 707/736 |
| 2012/0016863 A1* | 1/2012 | Bernhardt | G06F 17/30705 707/710 |
| 2012/0020563 A1* | 1/2012 | Amir | G06K 9/3266 382/182 |
| 2012/0284267 A1 | 11/2012 | Abuelsaad et al. | |
| 2013/0080426 A1* | 3/2013 | Chen | G06F 17/30247 707/723 |
| 2013/0159885 A1* | 6/2013 | Yerli | G06Q 10/10 715/753 |
| 2014/0211988 A1* | 7/2014 | Fan | G06K 9/3241 382/103 |
| 2014/0250144 A1* | 9/2014 | Guzenda | H04L 67/327 707/769 |
| 2016/0110476 A1* | 4/2016 | Shinkuma | G06F 17/30587 707/741 |

OTHER PUBLICATIONS

Ziyou Xiong, "Audio-Visual Sports Highlights Extraction Using Coupled Hidden Markov Models," Pattern Analysis and Applications, Sep. 2005, pp. 62-71, vol. 8, Nos. 1-2.

IBM, "Method and Apparatus for Incremental Augmentation and Visual Indication of Event Context Information," IPCOM000033098D, Nov. 2004, 6 pages.

K.-S. Goh et al., "Audio-Visual Event Detection Based on Mining of Semantic Audio-Visual Labels," Mitsubishi Electric Research Laboratories, Inc., TR-2004-008, http://www.merl.com, Mar. 2004, 10 pages.

* cited by examiner

ASSOCIATION OF VISUAL LABELS AND EVENT CONTEXT IN IMAGE DATA

This invention was made with Government support under Contract No. D11PC20070 (Department of Interior). The Government has certain rights in this invention.

FIELD

The present application relates to image data management in a computing system and, more particularly, to associating visual labels with event context for such data.

BACKGROUND

There has been significant progress in the last few decades in image annotation to label and manage large amounts of visual content. However, existing approaches to image annotation are limited in the aspect of treating each label individually with a limited vocabulary.

Existing approaches require selection from pre-defined concepts or calendar events, which comprise the vocabulary for image annotation. These concepts are usually organized by a flat structure. Since the size of a flat vocabulary is usually limited, the annotations fail to provide a structured, comprehensive description for the images.

To enlarge the vocabulary, one existing approach mines the World Wide Web (web) to collect additional labels from online data. However, the tags from web data are noisy and not properly labeled. Since these tags are labeled by a variety of users, it is impossible to expect that the labels are consistent in nature.

SUMMARY

Embodiments of the invention provide improved techniques for associating visual labels with event context for image data in a computing system.

For example, in one embodiment, a method comprises the following steps. A first set of contextual dimensions is generated from one or more textual descriptions associated with a given event, which includes one or more examples. A second set of contextual dimensions is generated from one or more visual features associated with the given event, which includes one or more visual example recordings. A similarity structure is constructed from the first set of contextual dimensions and the second set of contextual dimensions. One or more of the textual descriptions is matched with one or more of the visual features based on the similarity structure.

In yet another embodiment, a computer program product is provided which comprises a processor-readable storage medium having encoded therein executable code of one or more software programs. The one or more software programs when executed by one or more processing devices implement steps of the above-described method.

In a further embodiment, an apparatus comprises a memory and a processor operatively coupled to the memory and configured to perform steps of the above-described method.

Advantageously, illustrative embodiments of the invention provide for building an extensive taxonomy for image annotation. Such illustrative embodiments can leverage human knowledge for a visual domain. However, different from the existing datasets, taxonomies according to illustrative embodiments of the invention can guarantee that there is no overlapping between leaf concepts under the same facet. Furthermore, illustrative embodiments provide techniques to extend visual concepts to textual concepts, classify them into multiple classes, construct hierarchical taxonomies and generate taxonomy graphs, or compute the relatedness of the image for a given event. It is to be appreciated that illustrative embodiments apply to video annotation as well.

These and other objects, features, and advantages of the present invention will become apparent from the following detailed description of illustrative embodiments thereof, which is to be read in connection with the accompanying drawings.

DETAILED DESCRIPTION

Embodiments of the present invention will be described herein with reference to exemplary computing systems including operatively coupled processing devices such as one or more servers and one or more client devices (clients). It is to be appreciated, however, that embodiments of the invention are not restricted to use with the particular illustrative system and device configurations shown. Moreover, the phrase "computing system" as used herein with respect to various embodiments is intended to be broadly construed, so as to encompass, for example, private or public cloud computing systems, or parts thereof. However, a given embodiment may more generally comprise any arrangement of processing devices.

Figure 1:
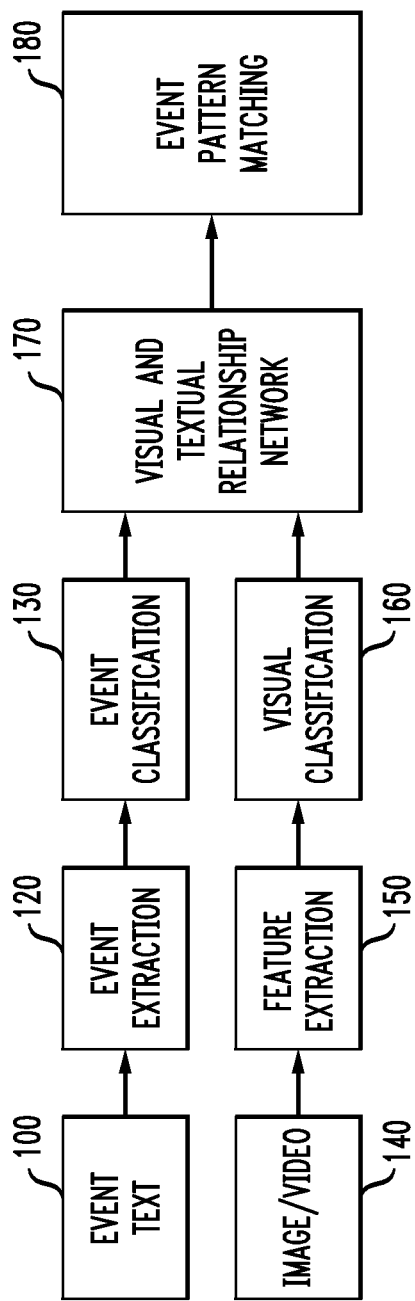
FIG. 1 illustrates a workflow for associating audio-visual labels to an event context according to an embodiment of the invention.

A flow diagram illustrated in FIG. 1 illustrates the overall workflow for associating the audio-visual labels to an event context in accordance with one illustrative embodiment. Building blocks shown in FIG. 1 are described below in more detail in subsequent figures and corresponding descriptions. The workflow takes one or possibly multiple event text descriptions 100. For example, a corpus of text describes the event "birthday parties." The workflow also ingests one or possibly multiple images and/or video content about the same event 140. For example, a corpus of images and video clips depict "birthday parties." In the subsequent processing steps, concepts related to the event are extracted based on one or multiple taxonomies in text and visual features 120 (event extraction), 130 (event classification), 150 (feature extraction), and 160 (visual classification). A relationship network between the two modalities is then created to link elements of respective taxonomies 170. Finally, the most selective visual event features are pattern matched to textual concepts 180.

It is to be appreciated that the phrases "visual features" or "visual labels" as used herein are understood to comprise "audio-visual features" or "audio-visual labels" when a video or an image has an audio content component along with the visual content component. Thus, the phrases may be interchangeably used herein in the description of illustrative embodiments.

Figure 2:
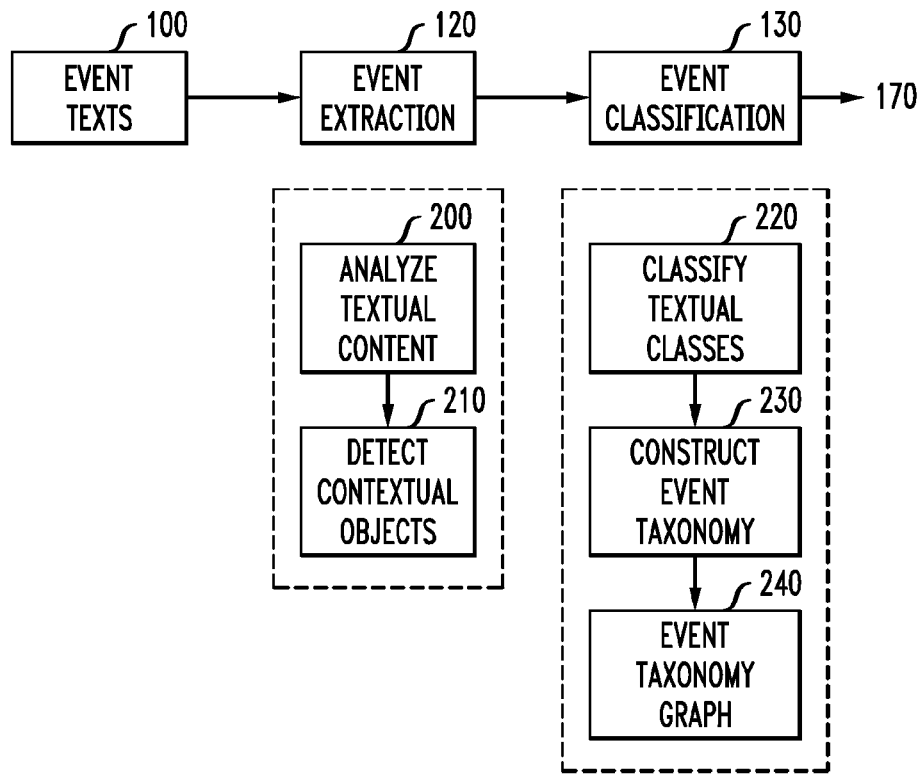
FIG. 2 illustrates a processing flow comprising steps of textual processing for analyzing and classifying event texts according to an embodiment of the invention.

FIG. 2 expands on the steps 100, 120, and 130 from FIG. 1. Specifically, step 120 is expanded into two steps 200 and 210. Step 200 parses the textual content in the corpus and identifies the terms and phrases appearing in one or multiple taxonomies such as WordNet™ (Princeton University) and Wikipedia™ (Wikimedia Foundation). For example, descriptions about 'birthday parties' likely contain high frequency words such as "cake," "birthday cake," "candle," "balloon," and "piñata." Step 210 detects and maps these words to objects in the taxonomy that have close semantic proximity with each other. Semantic proximity is measured as the distance (or hops) between two words in a taxonomy.

Step 130 is further expanded into steps 220, 230 and 240. Step 220 classifies the textual objects into classes including location (e.g., indoor, outdoor, restaurant, stadium, etc.), non-moving objects (e.g., candle, cake, balloon, etc.), moving objects (e.g., people, adult, child, pony, etc.), and activities (e.g., singing, dancing). Steps 230 (construct event taxonomy) and 240 (event taxonomy graph) place the co-occurrence relationship of the identified objects in a time sequence to describe the event.

Figure 3:
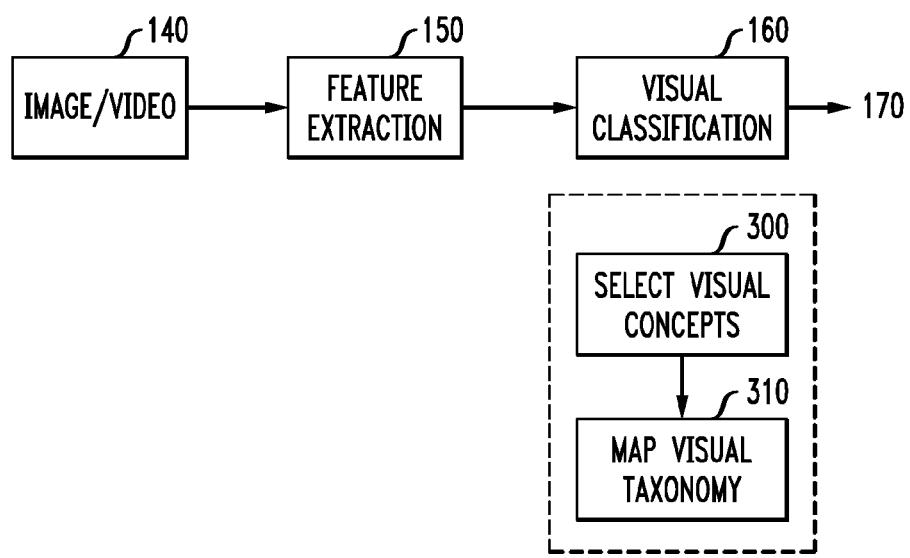
FIG. 3 depicts a processing flow comprising steps to classify audio-visual labels in a visual taxonomy according to an embodiment of the invention.

FIG. 3 expands on steps 140, 150 and 160 with details on 160 in particular. We assume one or multiple visual taxonomies already exist that can be used to classify visual content in the corpus. Step 160 is further expanded into steps 300 (select visual concepts) and 310 (map visual taxonomy). An image or a video frame is classified based on its visual features (e.g., color, textual, shape, etc.) to one or multiple likely visual concepts in the taxonomy. For example, a video frame of colored balloons looks similar to the images of "balloon" and "flower bouquet" in the visual taxonomy. Step 160 outputs both visual concepts in the temporal order of the video clip for subsequent matching.

Figure 4:
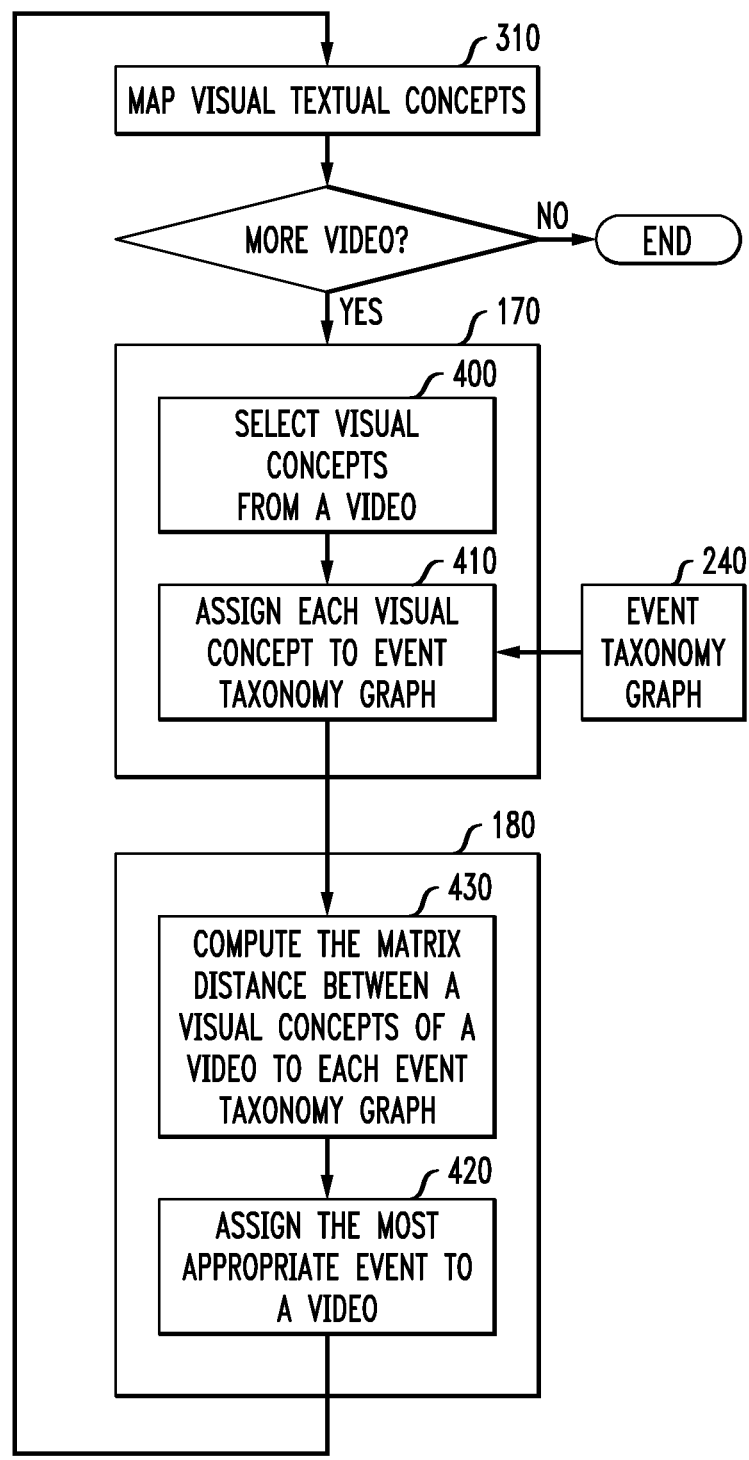
FIG. 4 illustrates a processing flow comprising steps to map visual labels to an event context according to an embodiment of the invention.

FIG. 4 expands on steps 170 and 180 to establish event to visual feature mapping. Step 170 is expanded into steps 400 and 410 to construct a visual and textual concept relationship network (matrix). Step 400 iterates over each visual concept identified, such as "balloon" and "flower bouquet." Step 410 associates the visual concept to the event taxonomy graph constructed in step 240. The concept may be associated with a location, a non-moving object, a moving object or an activity. The output of step 410 is a matrix with visual concepts in the columns and textual concepts in the rows.

Step 180 is further expanded into steps 420 and 430. Step 430 computes the co-occurrence matrix to the most relevant elements in an image or video to an event. Step 420 then assign textual concepts to the image or relevant video frames.

Figure 5:
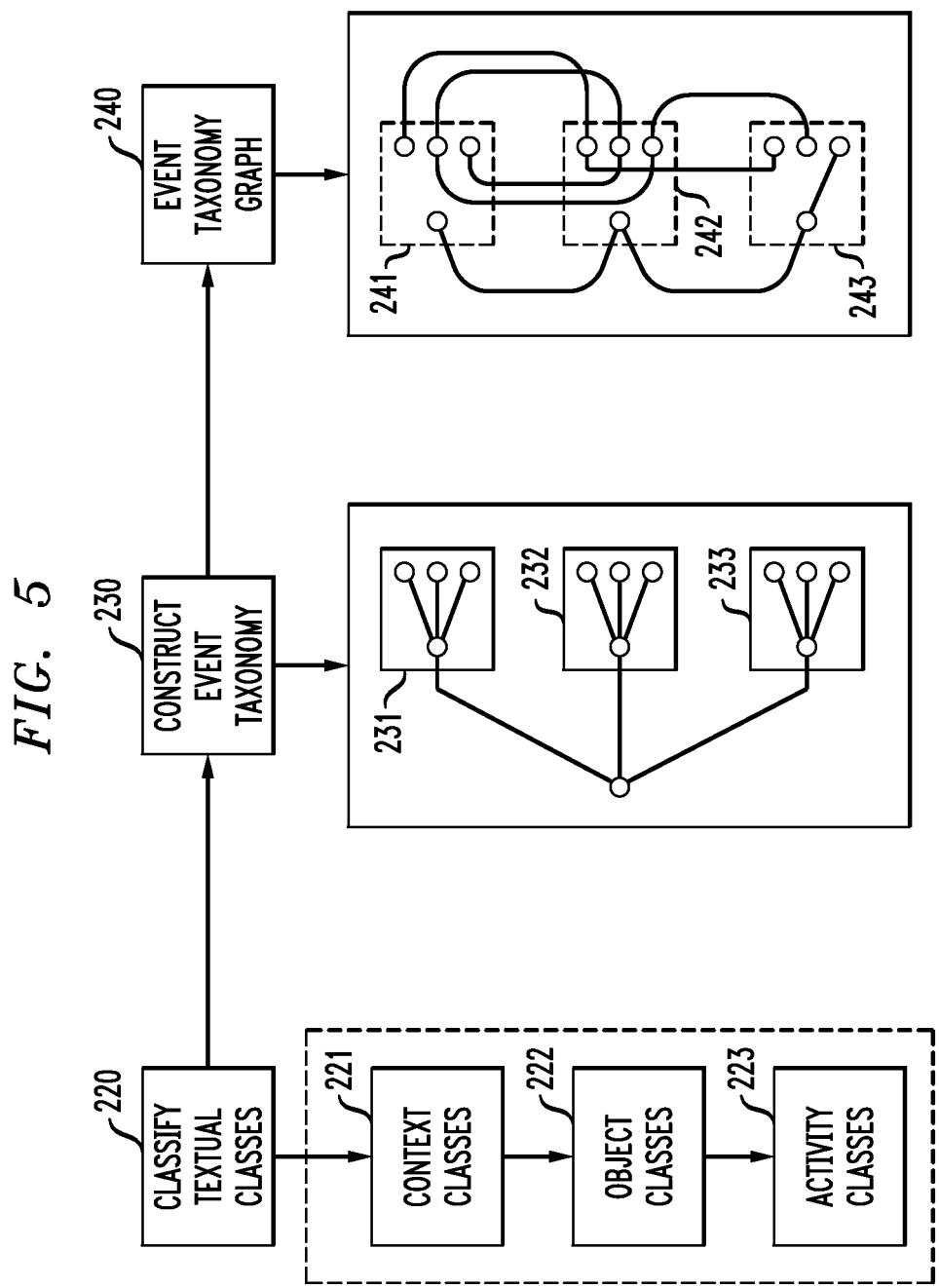
FIG. 5 illustrates a processing flow between classification of textual classes, construction of an event taxonomy, and an event taxonomy graph according to an embodiment of the invention.

FIG. 5 expands on steps 220, 230 and 240 to establish the classification of an event to several textual classes. An event can be identified by a combination of context classes in step 221, object classes in step 222, and activity classes in step 223. Step 221 detects the context in which the event occurs for example a "birthday party" event can be indoor or a restaurant. Step 222 detects the non-moving and moving objects that are part of the context described in step 221. Step 223 detects activities that can be defined between moving and non-moving objects (e.g., a boy is singing, an adult cuts a cake).

Step 230 expands on steps 231, 232, and 233. Step 231 constructs a hierarchical sub-tree of the context classes that includes the parent nodes (e.g., hypernyms) child nodes (e.g., hyponyms), and part-of (e.g., hyponyms). For example, the hypernyms of an object "restaurant" can be building, construction, and artifact. The hyponyms can be related to a "bistro," "cafeteria," or "diner." The hyponyms can be associated to a restaurant chain. Step 232 applies the same hierarchical construction to non-moving and moving objects. Step 233 constructs a hierarchical tree of all activity classes for a given event.

Step 240 expands on steps 241, 242, and 243. For a given event, the event taxonomy graph includes nodes and weighted edges. Each object is represented as a node in the event taxonomy graph and a weighted edge connecting two objects is defined as the relatedness between them. There are two types of weighted edges: the first one is defined as the relatedness among objects in the same class and the second one is defined as the relatedness between objects from different classes. The same graph construction can be applied to step 242 for objects and 243 for activities.

It is to be understood that the processing flow described in FIG. 5 produces a taxonomy graph for each event that comprises a set of textual concepts. For a given event, each textual taxonomy graph represents a particular event pattern, which is considered to be an example of a first set of contextual dimensions for one or more textual descriptions associated with a given event.

Figure 6:
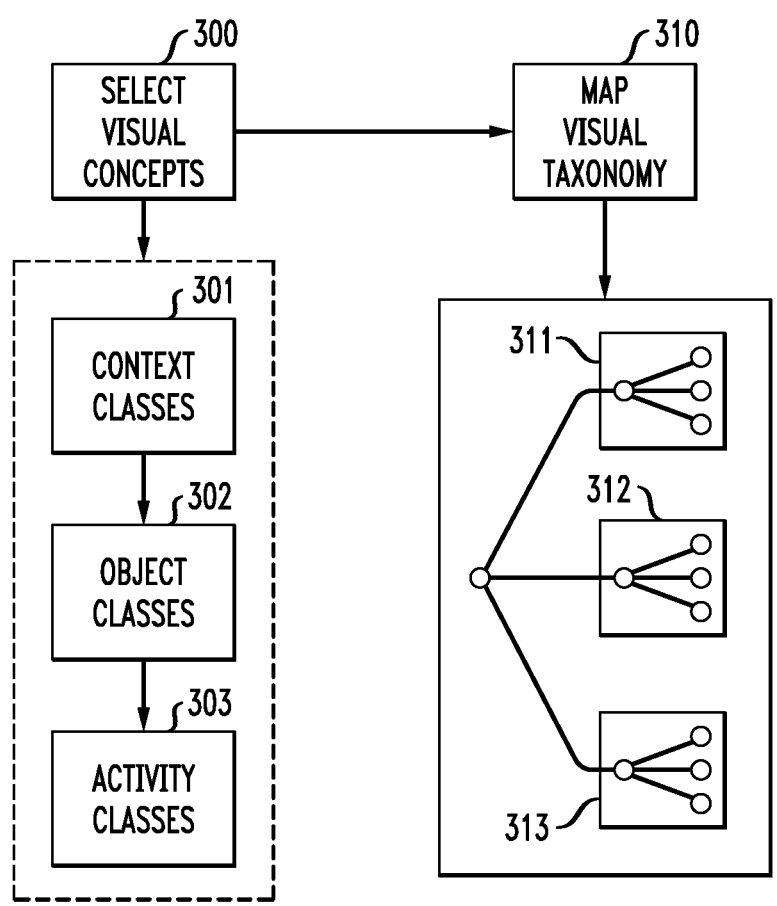
FIG. 6 illustrates a processing flow for selection of visual concepts and mapping between visual concepts and visual taxonomy through textual concepts according to an embodiment of the invention.

FIG. 6 expands on steps 300 and 310. Each image or video frame is represented as a vector of visual concepts. Each visual concept can be associated to one or many textual concepts (e.g., "air_animal" can be associated with "animal" and "wing"). Therefore, each visual concept with its textual concepts can be classified into context, object, or activity classes in step 301, 302 and 303, respectively.

Step 310 expands on steps 311, 312 and 313. Using the same construction techniques defined in step 230, each visual concept can be assigned to an hierarchical sub-tree for each class (e.g., "air_animal" can be associated with "animal" and "wing" as part-of "bird" concept). Therefore, step 311 constructs a hierarchical sub-tree for context class, step 312 for object class, and step 313 for activity class.

Thus, it is to be appreciated that in FIG. 6, a similar procedure as used in FIG. 5 is applied to the audio-visual concepts to construct visual patterns that comprise textual concepts represented by a specific hierarchical taxonomy for each video/image. At this phase, no association of event can be detected. The hierarchical graph is constructed based on the textual taxonomy (e.g., WordNet™) for a given set of visual concepts detected at the feature extraction process. This step yields a second textual taxonomy which is considered to be an example of a second set of contextual dimensions. Subsequently, the relatedness of each video (i.e., the second set of contextual dimensions of each video/ image) is computed to find the best match event (i.e., represented by the first set of contextual dimensions) from all the events.

Figure 7:
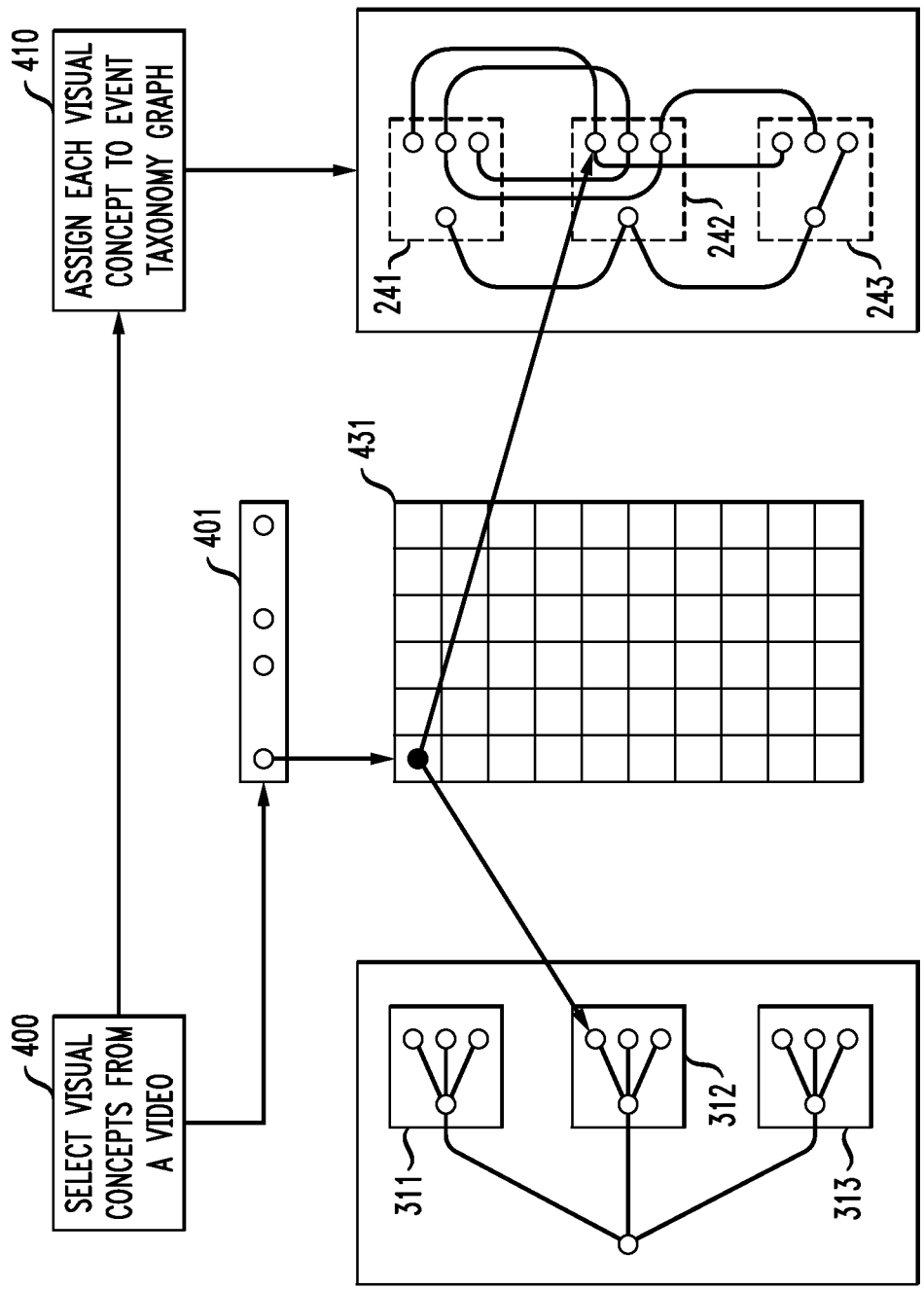
FIG. 7 illustrates a processing flow of a relatedness evaluation of each image or video frame for matching between an image and an event according to an embodiment of the invention.

FIG. 7 expands on steps 400 and 410. In step 401, each image or video frame is represented as a vector of visual concepts. The step 410 retrieves the textual concepts (e.g., "animal" and "wing") related to each visual concept (e.g., "air_animal") from the hierarchical sub-tree (e.g., sub-tree for objects of step 312) and finds the best match of an event from the event taxonomy graph (e.g., node in step 242). The weighted value represents the relatedness between this specific visual concept and an event. Each weighted value is stored in the relatedness table of step 431. The matrix of relatedness table represents the relationship between images and events. Each row represents a vector of visual concept weights and each column represents an event. As example, the "animal" and "wing" associated with "air_animal" are retrieved from the hierarchical sub-tree in step 312 and then be used to compute the relatedness from the event taxonomy graph in step 410. A similar process occurs for context class (steps 311 and 241) and activity class (steps 313 and 243).

The relatedness table 431 can be used to find the best match between an image and an event. The combination of all the weighted vectors for a given video can be used to predict the relatedness of the video and a set of events.

Advantageously, embodiments described herein provide a method to map textual descriptions of events (or activities) to relevant audio-visual features in a library, comprising steps of: deriving a set of contextual dimensions for each event context from one or multiple taxonomies or ontology; deriving a set of contextual dimensions for each audio-visual feature in the library from one or multiple taxonomies or ontology; constructing a similarity matrix between events and audio-visual features; and, subject to optimization criteria, matching events and features.

As will be appreciated by one skilled in the art, embodiments of the invention may be embodied as a system, apparatus, method or computer program product. Accordingly, embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 7, the diagrams in the figures illustrate the architecture, functionality, and operation of possible implementations of systems, methods and computer program products according to various embodiments of the invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-7, can also include, as described herein, providing a system, wherein the system includes distinct modules (e.g., modules comprising software, hardware or software and hardware). These and other modules may be configured, for example, to perform the steps described and illustrated in the context of FIGS. 1-7.

Figure 8:
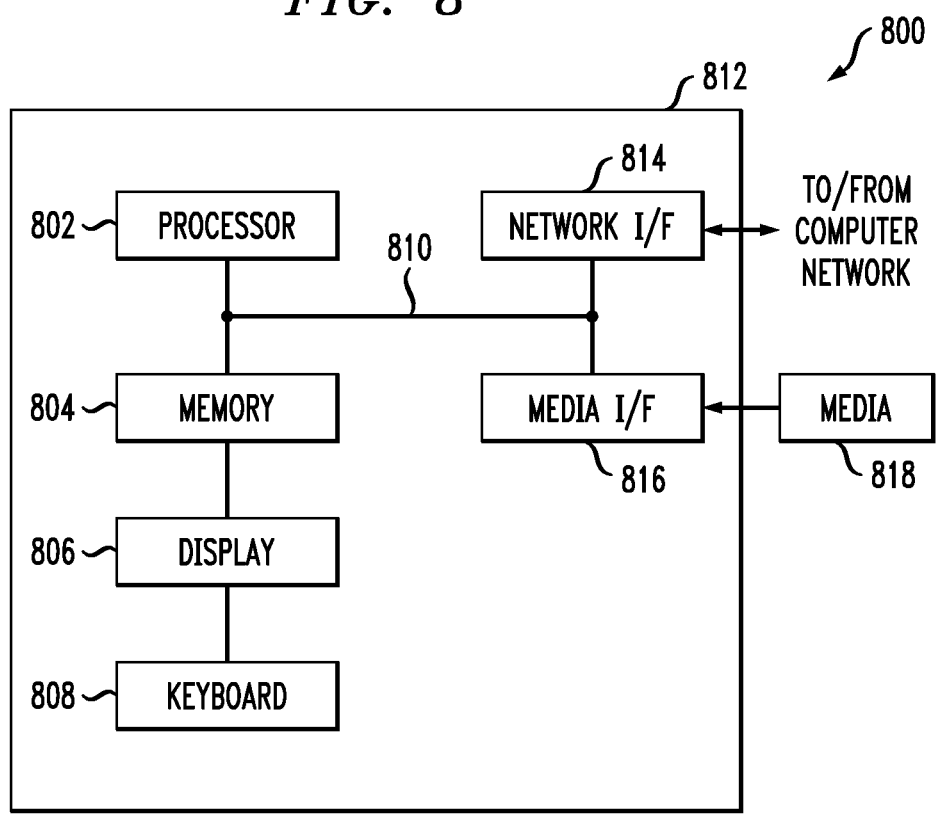
FIG. 8 illustrates a computing system in accordance with which one or more components/steps of modules/methodologies are implemented according to an embodiment of the invention.

One or more embodiments can make use of software running on a general purpose computer or workstation. With reference to FIG. 8, such an implementation 800 employs, for example, a processor 802, a memory 804, a display 806 (an example of an output device), and a keyboard 808 (an example of an input device). The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/output devices" as used herein, is intended to include (but not be limited to) one or more mechanisms for inputting data to the processing unit and one or more mechanisms for providing results associated with the processing unit.

The processor 802, memory 804, and input/output devices 806/808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output (I/O) devices 806/808 can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

Accordingly, it is to be understood that the computer architecture 800 shown in FIG. 8 may represent one illustrative physical implementation of a client and/or a server. For example, a server includes a physical data processing system (for example, system 812 as shown in FIG. 8) running a server program. Also, the computer architecture 800 could represent an illustrative implementation of a client, e.g., a laptop, tablet, smartphone, or personal computer. The computer architecture 800 could alternatively represent multiple processing devices (e.g., multiple clients, multiple servers, or combinations of clients and servers).

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   generating a first set of contextual dimensions from one or more textual descriptions associated with a given event, wherein the one or more textual descriptions comprise a corpus of text describing one or more aspects of the given event, and the first set of contextual dimensions results in a first taxonomy for the one or more textual descriptions;
   generating a second set of contextual dimensions from one or more audio-visual features associated with the given event, wherein the one or more audio-visual features comprise at least one of a video content and an image content that visually depicts the one or more aspects of the given event together with an audio content component, and the second set of contextual dimensions results in a second taxonomy for the one or more audio-visual features;
   constructing a similarity structure from the first set of contextual dimensions and the second net of contextual dimensions, wherein the similarity structure comprises a visual and textual concept relationship network that links the first taxonomy and the second taxonomy based on relatedness between elements of the first taxonomy and the second taxonomy; and
   matching one or more of the textual descriptions with one or more of the audio-visual features based on the similarity structure such that the one or more textual descriptions that match the one or more audio-visual features serve to annotate the one or more audio-visual features;
   wherein the generating, constructing and matching steps are performed via one or more processing devices.

2. The method of claim 1, wherein the step of generating a first set of contextual dimensions for one or more textual descriptions associated with a given event further comprises parsing the one or more textual descriptions associated with the given event by identifying one or more terms or one or more sets of terms appearing in one or more taxonomies or one or more ontologies.

3. The method of claim 2, wherein the step of generating a first set of contextual dimensions for one or more textual descriptions associated with a given event further comprises mapping the one or more identified terms or one or more identified sets of terms to one or more textual objects in the one or more taxonomies or the one or more ontologies.

4. The method of claim 3, wherein the step of generating a first set of contextual dimensions for one or more textual descriptions associated with a given event further comprises classifying the one or more textual objects into one or more classes.

5. The method of claim 4, wherein the step of generating a first set of contextual dimensions for one or more textual descriptions associated with a given event further comprises arranging the one or more classified textual objects in a time sequence describing the given event in one or more event taxonomy graphs.

6. The method of claim 5, wherein the step of generating a second set of contextual dimensions for one or more audio-visual features associated with the given event further comprises extracting the one or more audio-visual features associated with the given event from one or more images or one or more objects from a video frame from one or more videos.

7. The method of claim 6, wherein the step of generating a second set of contextual dimensions for one or more audio-visual features associated with the given event further comprises classifying the one or more audio-visual features into one or more visual concepts associated with one or more taxonomies or one or more ontologies.

8. The method of claim 1, wherein the step of constructing a similarity structure from the first set of contextual dimensions and the second set of contextual dimensions further comprises forming the relationship network by associating each of the one or more visual concepts to the one or more event taxonomy graphs.

9. The method of claim 8, wherein the step of matching one or more of the textual descriptions with one or more of the audio-visual features based on the similarity structure further comprises assigning a relevant one of the one or more textual descriptions to one of the one or more images or the one or more videos based on the formed relationship network.

10. The method of claim 9, wherein the step of classifying the one or more textual objects and the step of classifying the one or more audio-visual features further comprise selecting from context classes, object classes and activity classes.

11. A computer program product comprising a processor-readable storage medium having encoded therein executable code of one or more software programs, wherein the one or more software programs when executed by the one or more processing devices implement steps of:

generating a first set of contextual dimensions from one or more textual descriptions associated with a given event, wherein the one or more textual descriptions comprise a corpus of text describing one or more aspects of the given event, and the first set of contextual dimensions results in a first taxonomy for the one or more textual descriptions;

generating a second set of contextual dimensions from one or more audio-visual features associated with the given event, wherein the one or more audio-visual features comprise at least one of a video content and an image content that visually depicts the one or more aspects of the given event together with an audio content component, and the second set of contextual dimensions results in a second taxonomy for the one or more visual features;

constructing a similarity structure from the first set of contextual dimensions and the second set of contextual dimensions, wherein the similarity structure comprises a visual and textual concept relationship network that links the first taxonomy and the second taxonomy based on relatedness between elements of the first taxonomy and the second taxonomy; and matching one or more of the textual descriptions with one or more of the audio-visual features based on the similarity structure such that the one or more textual descriptions that match the one or more audio-visual features serve to annotate the one or more audio-visual features.

12. An apparatus, comprising:
a memory; and
a processor operatively coupled to the memory and configured to: generate a first set of contextual dimensions from one or more textual descriptions associated with a given event, wherein the one or more textual descriptions comprise a corpus of text describing one or more aspects of the given event,and the first set of contextual dimensions results in a first taxonomy for the one or more textual descriptions; generate a second set of contextual dimensions from one or more audio-visual features associated with the given event, wherein the one or more audio-visual features comprise at least one of a video content and an image content that visually depicts the one or more aspects of the given event together with an audio content component, and the second set of contextual dimensions results in a second taxonomy for the one or more audio-visual features; construct a similarity structure from the first set of contextual dimensions and the second set of contextual dimensions, wherein the similarity structure comprises a visual and textual concept relationship network that links the first taxonomy and the second taxonomy based on relatedness between elements of the first taxonomy and the second taxonomy; and match one or more of the textual descriptions with one or more of the audio-visual features based on the similarity structure such that the one or more textual descriptions that match the one or more visual audio-visual features serve to annotate the one or more audio-visual features.

13. The apparatus of claim 12, wherein generating a first set of contextual dimensions for one or more textual descriptions associated with a given event further comprises parsing the one or more textual descriptions associated with the given event by identifying one or more terms or one or more sets of terms appearing in one or more taxonomies or one or more ontologies.

14. The apparatus of claim 13, wherein generating a first set of contextual dimensions for one or more textual descriptions associated with a given event further comprises mapping the one or more identified terms or one or more identified sets of terms to one or more textual objects in the one or more taxonomies or the one or more ontologies.

15. The apparatus of claim 14, wherein generating a first set of contextual dimensions for one or more textual descriptions associated with a given event further comprises classifying the one or more textual objects into one or more classes.

16. The apparatus of claim 15, wherein generating a first set of contextual dimensions for one or more textual descriptions associated with a given event further comprises arranging the one or more classified textual objects in a time sequence describing the given event in one or more event taxonomy graphs.

17. The apparatus of claim 16, wherein generating a second set of contextual dimensions for one or more audio-visual features associated with the given event further comprises extracting the one or more audio-visual features associated with the given event from one or more images or one or more objects from a video frame from one or more videos.

18. The apparatus of claim 17, wherein generating a second set of contextual dimensions for one or more audio-visual features associated with the given event further comprises classifying the one or more audio-visual features into one or more visual concepts associated with one or more taxonomies or one or more ontologies.

19. The apparatus of claim 12, wherein constructing a similarity structure from the first set of contextual dimensions and the second set of contextual dimensions further comprises forming the relationship network by associating each of the one or more visual concepts to the one or more event taxonomy graphs.

20. The apparatus of claim 19, wherein matching one or more of the textual descriptions with one or more of the audio-visual features based on the similarity structure further comprises assigning a relevant one of the one or more textual descriptions to one of the one or more images or the one or more videos based on the formed relationship network.

21. The apparatus of claim 20, wherein classifying the one or more textual Objects and the step of classifying the one or more audio-visual features further comprise selecting from context classes, object classes and activity classes.

* * * * *